United States Patent
Shiu et al.

(10) Patent No.: US 9,543,833 B2
(45) Date of Patent: Jan. 10, 2017

(54) CONSTANT ON TIME CONTROLLER

(71) Applicant: GREEN SOLUTION TECHNOLOGY CO., LTD., New Taipei (TW)

(72) Inventors: Shian-Sung Shiu, New Taipei (TW); Chao Shao, Wuxi (CN); Li-Min Lee, New Taipei (TW)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 279 days.

(21) Appl. No.: 14/254,905

(22) Filed: Apr. 17, 2014

(65) Prior Publication Data

US 2015/0214839 A1   Jul. 30, 2015

(30) Foreign Application Priority Data

Jan. 30, 2014  (CN) .......................... 2014 1 0043588

(51) Int. Cl.
*H02M 3/156*  (2006.01)
*H02M 1/00*   (2006.01)

(52) U.S. Cl.
CPC ..... *H02M 3/156* (2013.01); *H02M 2001/0022* (2013.01)

(58) Field of Classification Search
CPC .... H02M 3/156; H02M 3/158; H02M 3/1588; H02M 2001/0022
See application file for complete search history.

(56) References Cited

U.S. PATENT DOCUMENTS

| | | | | |
|---|---|---|---|---|
| 8,773,099 | B2* | 7/2014 | Granger | H02M 3/1588 323/284 |
| 2012/0268088 | A1* | 10/2012 | Lee | H02M 3/1588 323/271 |
| 2013/0002223 | A1* | 1/2013 | Xi | H02M 3/158 323/284 |
| 2013/0293214 | A1 | 11/2013 | Chang et al. | |
| 2015/0069982 | A1* | 3/2015 | Ouyang | H02M 3/156 323/234 |
| 2015/0188433 | A1* | 7/2015 | Jiang | H02M 3/156 323/271 |

FOREIGN PATENT DOCUMENTS

| | | |
|---|---|---|
| CN | 102364855 A | 2/2012 |
| CN | 102624214 A | 8/2012 |
| CN | 102751870 A | 10/2012 |
| CN | 102832810 A | 12/2012 |
| CN | 103391002 A | 11/2013 |
| JP | 2013162585 A | 8/2013 |
| TW | 201249076 A | 12/2012 |

* cited by examiner

*Primary Examiner* — Matthew Nguyen
(74) *Attorney, Agent, or Firm* — CKC & Partners Co., Ltd.

(57) ABSTRACT

The present invention provides a constant on time controller packaged in one single package for controlling a buck converting circuit to convert an input voltage into an output voltage. The constant on time controller includes an input voltage detecting circuit, an on-time determining circuit and a driving circuit. The input voltage detecting circuit receives a bootstrap voltage to generate an input voltage detecting signal indicative of the input voltage. The on-time determining circuit receives the input voltage detecting signal and generates an on-time signal in response to the input voltage detecting signal and the output voltage. The driving circuit controls the buck converting circuit according to the n-time signal.

14 Claims, 3 Drawing Sheets

CONSTANT ON TIME CONTROLLER

RELATED APPLICATIONS

This application claims priority to Chinese Application Serial Number 201410043588.9, filed Jan. 30, 2014, which is herein incorporated by reference.

BACKGROUND OF THE INVENTION (1) Field of the Invention

The present invention relates to a constant on time controller, and more particularly relates to a constant on time controller for deciding a constant on-time period according to a bootstrap voltage.

(2) Description of the Prior Art

FIG. 1 is a schematic diagram of a conventional buck converting circuit and a constant on time controller. The buck converting circuit comprises a high-side transistor M1, a low-side transistor M2, an inductance L and a capacitance C. The high-side transistor M1 is coupled between an input voltage Vin and a switching node, and the low-side transistor M2 is coupled between the switching node and a ground potential. The inductance L and the capacitance C are connected in series between the switching node and the ground potential for filtering a voltage of the switching node into an output voltage Vout. The constant on time controller controls the switchings of the high-side transistor M1 and the low-side transistor M2 of the buck converting circuit, and a duty cycle of the high-side transistor M1 decides a ratio of the output voltage Vout to the input voltage Vin.

The constant on time controller comprises comparators 8 and 10, a SR flip-flop 9, a capacitance 11, a transistor 12, a resistance 13 and a driving circuit 19. One terminal of the resistance 13 is connected to the input voltage Vin, and another terminal thereof is connected to the capacitance 11. A non-inverting terminal of the comparator 8 and an inverting terminal of the comparator 10 receive a reference voltage Vref. An inverting terminal of the comparator 8 receives the output voltage Vout, and triggers a set terminal S of the SR flip-flop 9 when the output voltage Vout is lower than the reference voltage Vref for enabling the SR flip-flop 9 to generate a high level signal at an output terminal Q. At this moment, the driving circuit 19 turns on the high-side transistor M1 and cuts off the low-side transistor M2. At the same time, the SR flip-flop 9 generates a low level signal at an inverting output terminal Q to cut off the transistor 12. The capacitance 11 starts to be charged at this time. When a voltage of the capacitance 11 is raised to the reference voltage Vref, the comparator 10 outputs the high level signal to a reset terminal R of the SR flip-flop 9 for enabling the SR flip-flop 9 to output a low level signal at the output terminal Q and a high level signal at the inverting output terminal V. At this moment, the driving circuit 19 cuts off the high-side transistor M1 and turns on the low-side transistor M2. Besides, the transistor 12 is simultaneously turned on to discharge the capacitance 11 to zero through the transistor 12, so as to be ready for the output voltage Vout to be lower than the reference voltage Vref again. Thus, when the buck converting circuit is in a stable state, the output voltage Vout is substantially equal to the reference voltage Vref.

The aforementioned circuit uses the resistance 13 to generate a current proportional to the input voltage Vin for charging the capacitance 11 to reach the output voltage Vout. Therefore, in each cycle, the charging time period of the capacitance 11 is proportional to the ratio of the output voltage Vout to the input voltage Vin, i.e., the constant on time period is proportional to the ratio of the output voltage Vout to the input voltage Vin.

However, the constant on time controller has to additionally add a pin connected to the input voltage Vin for obtaining the information of the input voltage Vin, thus increasing the packaging cost of the constant on time controller.

SUMMARY OF THE INVENTION

In view of the conventional constant on time controller in which a pin has to be additionally added for obtaining the information of the input voltage, the constant on time controller of the present invention detects a bootstrap voltage or a high-side control signal for obtaining the information of the input voltage to save the package pin and the packaging cost.

To accomplish the aforementioned and other objects, the present invention provides a constant on time controller packaged in one single package for controlling a buck converting circuit to convert an input voltage into an output voltage. The constant on time controller comprises an input voltage detecting circuit, an on-time determining circuit and a driving, circuit. The input voltage detecting circuit receives a bootstrap voltage for generating an input voltage detecting signal indicative of the input voltage. The on-time determining circuit receives the input voltage detecting signal and generates an on-time signal according to the output voltage and the input voltage detecting a signal. The driving circuit controls the buck converting circuit according to the on-time signal.

The present invention also provides a constant on time controller packaged in one single package for controlling a buck converting circuit to convert an input voltage into an output voltage. The constant on time controller comprises an input voltage detecting circuit, an on-time determining circuit and a driving circuit. The input voltage detecting circuit receives a high-side control signal for generating an input voltage detecting signal indicative of the input voltage. The on-time determining circuit receives the input voltage detecting signal and generates an on-time signal according to the output voltage and the input voltage detecting signal. The driving circuit generates the high-side control signal according to the on-time signal and a bootstrap voltage for controlling the buck converting circuit.

It is to be understood that both the foregoing general description and the following, detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

In the following, detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
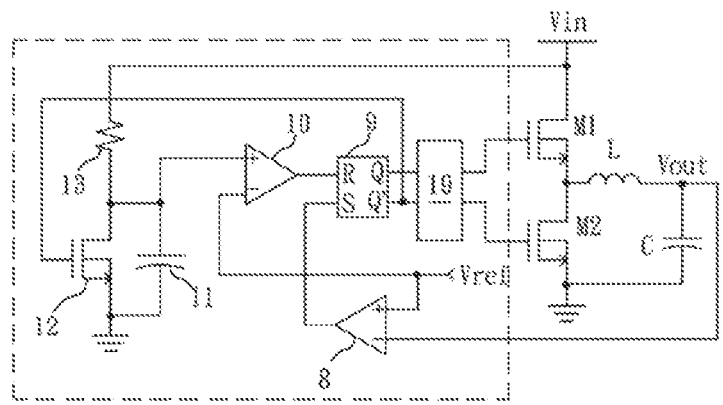
FIG. 1 is a schematic diagram of a conventional buck converting circuit and a constant on time controller.
Figure 2A:
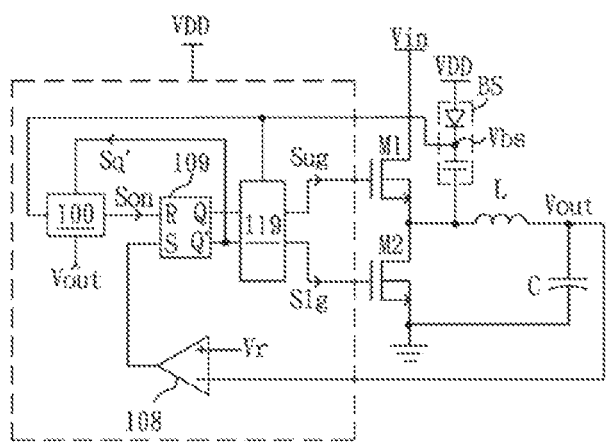
FIG. 2A is a schematic diagram of a buck converting circuit and a constant on time controller according to a first preferred embodiment of the present invention.

FIG. 2A is a schematic diagram of a buck converting circuit and a constant on time controller according to a first preferred embodiment of the present invention. The buck converting circuit comprises a high-side transistor M1, a low-side transistor M2, an inductance L and a capacitance C. The high-side transistor M1 is coupled between an input voltage Vin and a switching node, and the low-side transistor M2 is coupled between the switching node and a ground potential. The inductance L and the capacitance C are connected in series between the switching node and the ground potential, for filtering a voltage of the switching node into an output voltage Vout. The constant on time controller controls the switchings of the high-side transistor M1 and the low-side transistor M2 of the buck converting circuit, and the duty cycle of the high-side transistor M1 decides the proportion of the output voltage Vout to the input voltage Vin.

The constant on time controller is packaged in one single package for controlling a buck converting circuit to convert an input voltage into an output voltage. The constant on time controller comprises a constant on time circuit 100, a comparator 108, a SR flip-flop 109 and a driving circuit 119. A non-inverting terminal of the comparator 108 receives a reference voltage Vr, and an inverting terminal thereof receives the output voltage Vout or an output voltage detecting signal indicative of the output voltage Vout. For example, a voltage divider is connected to the output voltage Vout to generate the output voltage detecting signal. An output terminal of the comparator 108 is coupled to a set terminal S of the SR flip-flop 109. The comparator 108 outputs a high level signal when the output voltage Vout is lower than a preset output voltage value thereby enabling the SR flip-flop 109 to generate a high level signal at an output terminal Q and generate an inverted signal Sq' with a low level at an inverting output terminal Q'. At this moment, the driving circuit 119 outputs a high-side control signal Sug with a high level to turn on the high-side transistor M1, and outputs as low-side control signal Slg with a low level to cut off the low-side transistor M2. In actual applications, the SR flip-flop 109 may be integrated into the driving circuit 119, or may be omitted according to the modification of the driving circuit 119.

In the present invention, the high-side transistor M1 and the low-side transistor M2 are N-type MOSFETs. Hence, for ensuring the high-side transistor M1 to be turned on the high level of the high-side control signal Sug has to be more than a threshold voltage higher than the input voltage Vin. The present invention uses a bootstrap circuit BS, coupled to the switching node of a buck converting circuit (i.e., the connected node between the high-side transistor M1 and the low-side transistor M2) and a driving voltage VDD, for providing a bootstrap voltage Vbs which is higher than the input voltage Vin. In which, the driving voltage VDD connected to the constant on time controller is generated by a driving voltage source, so as to provided required operating power to the constant on time controller. In actual application, the driving voltage VDD may be the input voltage Vin, or another voltage source. In one embodiment, the bootstrap circuit BS comprises a diode and a bootstrap capacitance connected in series. A positive terminal of the diode is connected to the driving voltage VDD, and a negative terminal thereof is connected to one terminal of the bootstrap capacitance. Another terminal of the bootstrap capacitance is connected to the switching node. When the low-side transistor M2 is turned on, the driving voltage VDD charges the bootstrap capacitance via the diode. When the high-side transistor M1 is turned on, the potential of the switching node is pulled up to the input voltage Vin for enabling the bootstrap capacitance to provide a voltage equal to the sum of the input voltage Vin and the driving, voltage VDD to the driving circuit 119 of the constant on time controller. In other words, the bootstrap circuit BS periodically provides the bootstrap voltage Vbs which is higher than the input voltage Vin in response to the switchings of the high-side transistor M1 and the low-side transistor M2. The bootstrap circuit BS may be completely composed of external discrete devices, or parts (such as diodes) or all of the devices are integrated in the constant on time controller.

The constant on time circuit 100 is coupled to the bootstrap circuit BS for receiving the bootstrap voltage Vbs, and obtains the information of the input voltage Vin by filtering out the driving voltage VDD. The constant on time circuit 100 simultaneously receives a signal indicative of the output voltage Vout, such as the output voltage Vout, an output voltage detection signal, or a signal filtered from the connected node of the high-side transistor M1 and the low-side transistor M2, for determining a constant on time period according to the information of the input voltage Vin and the output voltage Vout. The following embodiments will be illustrated in detail to explain the operation and the principle of the constant on time circuit.

The constant on time circuit 100 is coupled to a reset terminal R of the RS flip-flop 109, and outputs an on-time signal Son to the reset terminal R in the constant on time period after the high-side transistor M1 is started to be turned on. At this moment, the SR flip-flop 109 outputs a low level signal at the output terminal Q, and outputs an inverted signal Sq' with high level at the inverting output terminal Q', for enabling the driving circuit 119 to cut oil the high-side transistor M1 and turn on the low-side transistor M2.

Figure 2B:
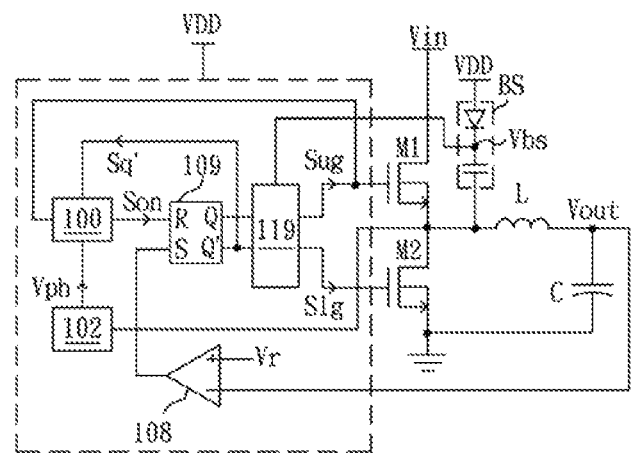
FIG. 2B is a schematic diagram of a buck converting circuit and a constant on time controller according to a second preferred embodiment of the present invention.

FIG. 2B is a schematic diagram of a buck converting circuit and a constant on time controller according to a second preferred embodiment of the present invention. Compared with the embodiment shown in FIG. 2A, tire constant on time circuit 100 of the present embodiment receives the high-side control signal Sug to replace the bootstrap voltage Vbs and a signal Vph indicative of the output voltage Vout. The signal Vph is generated by a filter 102 which is coupled to the connected node of the high-side transistor M1 and the low-side transistor M2. Because the high logic level of the high-side control signal Sug generated by the driving circuit 119 is the same as the bootstrap voltage Vbs, the constant on time circuit 100 of the present invention can be modified to receive the high-side control signal Sug and obtain the information of the input voltage Vin. The description of other circuits can be referred to the corresponding description in FIG. 2A.

Figure 3:
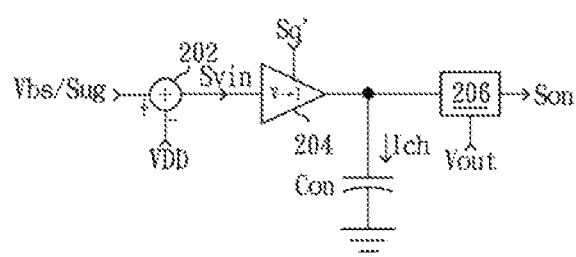
FIG. 3 is a schematic diagram of a constant on time circuit according to the first preferred embodiment of the present invention.

FIG. 3 is a schematic diagram of the constant on time circuit according to the first preferred embodiment of the present invention. The constant on time circuit comprises an input voltage detecting circuit and an on-tune determining circuit. The input voltage detecting circuit comprises an adder 202. The adder 202 generates an input voltage detecting signal Svin with the information of an input voltage Vin by subtracting the driving voltage VDD from the bootstrap voltage Vbs or the high-side control signal Sug. The on-time determining circuit comprises a voltage-to-current converter 204, a capacitance Con and a comparing circuit 206. The voltage-to-current converter 204 generates a charging current Ich to charge the capacitance Con according to the input voltage detecting signal Svin. The comparing circuit 206 generates an on-time signal Son according to a voltage of the capacitance Con and the output voltage Vout, for example, when the voltage of the capacitance Con rises to reach the output voltage Vout. The voltage-to-current converter 204 simultaneously receives the inverted signal Sq' generated by the SR flip-flop 109, and discharges the capacitance Con to zero when the inverted signal Sq' is at the high level. When the inverted signal Sq' is at the low level, the voltage-to-current converter 204 charges the capacitance Con. At this moment, the on-time determining circuit starts counting time until the voltage of the capacitance Con reaches the output voltage Vout, and then generates the on-time signal Son. Of course, except the inverted signal Sq', the signal outputted by the SR flip-flop 109 at the output terminal Q, the high-side control signal Sug or the low-side control signal Slg can be used to replace the inverted signal Sq' to control the voltage-to-current converter 204 to charge and discharge the capacitance Con.

Figure 4:
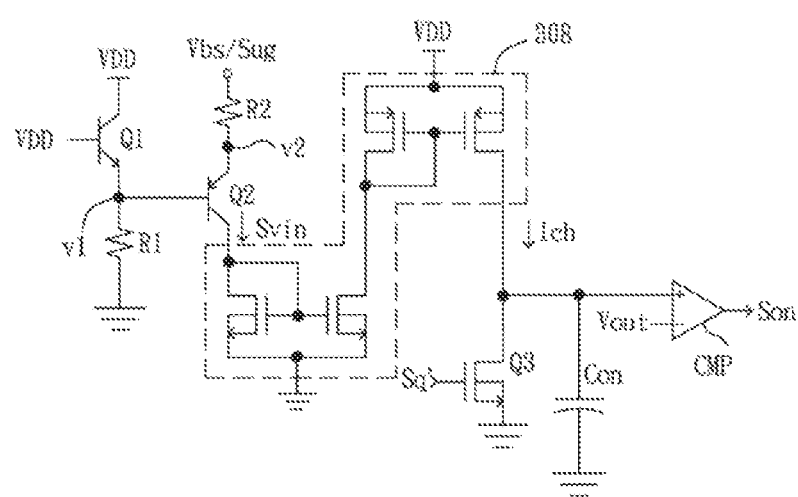
FIG. 4 is a schematic diagram of a constant on time circuit according to the second preferred embodiment of the present invention.

FIG. 4 is a schematic diagram of the constant on time circuit according to the second preferred embodiment of the present invention. The constant on time circuit comprises an input voltage detecting circuit and an on-time determining circuit. The input voltage detecting circuit comprises a first resistance R1, a second resistance R2 and transistors Q1 and Q2. The on-time determining circuit comprises a transistor Q3, a current mirror circuit 308, a capacitance Con and a comparing circuit CMP. The transistors Q1 and Q2 may be any transistors. For example, the transistor Q1 is a NMOS and the transistor Q2 is a PMOS, and both of them are airs. The present embodiment uses BJTs as an example for the below explanation.

The transistor Q1 is a BJT having a first collector, a first base and a first emitter. The first collector and the first base are coupled to a driving voltage VDD, and the first emitter is coupled to a ground potential through a first resistance R1. Thus, a potential v1 of a connected node between the first emitter of the transistor Q1 and the first resistance R1 is (VDD-Vbe1), wherein Vbe1 is a forward bias voltage of the transistor Q1. The transistor Q2 is a BIT having a second collector, a second base and a second emitter. The second emitter is coupled to a bootstrap voltage Vbs or a high-side control signal Sug through the second resistance R2, and the second base is coupled to the connected node between the first emitter of the transistor Q1 and the first resistance R1. Thus, a potential v2 of to connected node between the second emitter and the second resistance R2 is (v1+Vbe2) =(VDD-Vbe1+Vbe2), wherein Vbe2 is a forward bias voltage of the transistor Q2. When Vbe1=Vbe1, v2=VDD. An input voltage detecting signal Svin outputted by the second collector of the transistor Q2 is the same as the current flowing, through the second resistance R2, and thus the current is (Vbs-VDD)/R2, representing, to voltage difference obtained by subtracting the driving voltage VDD from the bootstrap voltage Nibs or the high-side control signal Sug. When the low-side transistor M2 is cut off and the high-side transistor M1 is turned on, the voltage level of the bootstrap voltage Vbs or the high-side control signal Sug is Vbs=Vin+VDD. Therefore, the input voltage detecting signal Svin is (Vin+VDD-VDD)/R2=Vin/R2, i.e., Svin is proportional to the input voltage Vin.

The function of the current mirror circuit 308 is a voltage-to-current converter, mirroring the input voltage detecting signal Svin outputted by the second collector of the transistor Q2 to generate a charging current Ich proportional to the input voltage Vin. The transistor Q3 and the capacitance Con are connected in parallel. The transistor Q3 is a N-type MOSFET, in which a gate electrode thereof receives the inverted signal Sq' generated by the SR flip-flop 109, and a drain electrode thereof is coupled to the current minor circuit 308, and a source electrode thereof is coupled to a ground potential. When the inverted signal Sq' is at the high level, i.e., the low-side transistor M2 is turned on and the high-side transistor M1 is cut off, the transistor Q3 is turned on to enable the charging current Ich to flow into the ground, and to discharge a voltage of the capacitance Con to zero. When the inverted signal Sq' is at the low level, i.e., the low-side transistor M2 is cut off and the high-side transistor M1 is turned on, the transistor Q3 is cut off. At this moment, the charging current Ich charges the capacitance Con.

A non-inverting terminal of the comparing circuit CMP is coupled to the capacitance Con, and an inverting terminal thereof receives an output voltage Vout (or an output voltage detecting signal indicative of the output voltage, such as a signal filtered from the switching node between the high-side transistor 12 and the low-side transistor M2). When the capacitance Con is charged by the charging current Ich to reach the output voltage Vout, the comparing circuit CMP outputs an on-time signal Son with the high level to enable the high-side transistor M1 to be turned on through the driving circuit 119. At the same time, the inverted signal Sq' is changed to the high level to turn on the transistor Q3, and resets the voltage of the capacitance Con to zero for the next cycle. Therefore, the period time of charging the voltage of the capacitance Con from zero to the output voltage Vout is proportional to the output voltage Vout, and is inversely proportional to the charging current Ich, i.e., inversely proportional to the input voltage Vin.

Furthermore, in the embodiment shown in FIG. 4, an one-shot circuit coupled can be added to an output terminal of the comparing circuit CMP to generate and provide the on-time signal Son with a specified pulse width to the SR flip-flop 109.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:
1. A constant on time controller packaged in one single package for controlling a buck converting circuit to convert an input voltage into an output voltage, the constant on time controller comprising:
 an input voltage detecting circuit for receiving a bootstrap voltage to generate an input voltage detecting signal indicative of the input voltage;

an on-time determining circuit for receiving the input voltage detecting signal, and generating an on-time signal according to the output voltage and the input voltage detecting signal; and a driving circuit for controlling the buck converting circuit according to the on-time signal.

2. The constant on time controller according to claim 1, wherein the input voltage detecting circuit comprises an adder for generating the input voltage detecting signal according to the bootstrap voltage and a driving voltage, wherein the driving voltage is generated by a driving voltage source so as to provide required operating power to the constant on time controller.

3. The constant on time controller according to claim 2, wherein the bootstrap voltage is provided by a bootstrap circuit coupled to a switching node of the buck converting circuit and the driving voltage source for providing the bootstrap voltage which is periodically higher than the input voltage.

4. The constant on time controller according to claim 2, wherein the on-time determining circuit comprises a voltage-to-current converter, a capacitance and a comparing circuit, and the voltage-to-current converter generates a charging current according to the input voltage detecting signal to charge the capacitance, and the comparing circuit generates the on-time signal according to a voltage of the capacitance and a signal indicative of the output voltage.

5. The constant on time controller according to claim 4, wherein the signal indicative of the output voltage is generated by a filter which is coupled to a switching node of the buck converting circuit.

6. The constant on time controller according to claim 2, wherein the input voltage detecting circuit comprises a first transistor coupled to the input voltage and a second transistor coupled to the bootstrap voltage and the first transistor, and the second transistor generates the input voltage detecting signal indicative of a voltage difference obtained by subtracting the driving voltage from the bootstrap voltage.

7. The constant on time controller according to claim 6, wherein both of the first transistor and the second transistor are bipolar junction transistors, the first transistor having a first collector, a first base and a first emitter, wherein the first collector and the first base are coupled to the driving voltage, and the first emitter is coupled to a ground potential through a first resistance; and the second transistor having a second collector, a second base and a second emitter, wherein the second base is coupled to a connected node between the first emitter and the first resistance, and the second emitter is coupled to the bootstrap voltage through a second resistance, and the second collector generates the input voltage detecting signal.

8. A constant on time controller packaged in one single package for controlling a buck converting circuit to convert an input voltage into an output voltage, the constant on time controller comprising:

an input voltage detecting circuit for receiving a high-side control signal to generate an input voltage detecting signal indicative of the input voltage;

an on-time determining circuit for receiving the input voltage detecting signal, and generating an on-time signal according to the output voltage and the input voltage detecting signal; and a driving circuit for generating the high-side control signal according to the on-time signal and a bootstrap voltage to control the buck converting circuit.

9. The constant on time controller according to claim 8, wherein the input voltage detecting circuit comprises an adder for generating the input voltage detecting signal according to the high-side control signal and a driving voltage, wherein the driving voltage is generated by a driving voltage source so as to provide required operating power to the constant on time controller.

10. The constant on time controller according to claim 9, wherein the bootstrap voltage is provided by a bootstrap circuit coupled to a switching node between the buck converting circuit and the driving voltage source for providing the bootstrap voltage which is periodically higher than the input voltage.

11. The constant on time controller according to claim 9, wherein the on-time determining circuit comprises a voltage-to-current converting circuit, a capacitance and a comparing circuit, and the voltage-to-current generates a charging current according to the input voltage detecting signal to charge the capacitance, and the comparing circuit generates the on-time signal according a voltage of the capacitance and a signal indicative of the output voltage.

12. The constant on time controller according to claim 11, wherein the signal indicative of the output voltage is generated by a filter coupled to a switching node of the buck converting circuit.

13. The constant on time controller according to claim 9, wherein the input voltage detecting circuit comprising a first transistor coupled to the input voltage and a second transistor coupled to the bootstrap voltage and the first transistor, and the second transistor generates the input voltage detecting signal indicative of a voltage difference obtained by subtracting the driving voltage from the high-side control signal.

14. The constant on time controller according to claim 13, wherein both of the first transistor and the second transistor are bipolar junction transistors, a first transistor having a first collector, a first base and a first emitter, wherein the first collector and the base are coupled to the driving voltage, and the first emitter is coupled to a ground potential through a first resistance; and a second transistor having a second collector, a second base and a second emitter, wherein the second base is coupled to a connected node of the first emitter and the first resistance, and the second emitter is coupled to the high-side control signal through a second resistance, and the second collector generates the input voltage detecting signal.

* * * * *